United States Patent [19]

Devlin et al.

[11] Patent Number: 5,290,633
[45] Date of Patent: Mar. 1, 1994

[54] COATING COMPOSITIONS BASED ON GRAFT POLYMERS

[75] Inventors: Brian P. Devlin, Audubon, Pa.; Joseph A. Antonelli, Riverton, N.J.; Christopher Scopazzi, Wilmington, Del.

[73] Assignee: E. I. Du Pont de Nemours and Company, Wilmington, Del.

[21] Appl. No.: 72,366

[22] Filed: Jun. 7, 1993

Related U.S. Application Data

[63] Continuation of Ser. No. 738,678, Jul. 31, 1991, abandoned.

[51] Int. Cl.$^5$ .................. C08L 51/00; C08L 75/00
[52] U.S. Cl. .................. 428/423.1; 525/66; 525/123; 525/124; 525/127; 427/385.5
[58] Field of Search .......... 525/66, 123, 124, 127; 428/423.1; 427/385.5

[56] References Cited

U.S. PATENT DOCUMENTS

| | | | |
|---|---|---|---|
| 4,153,643 | 5/1979 | Preston | 260/861 |
| 4,801,653 | 1/1989 | Das | 525/286 |
| 4,837,273 | 6/1989 | Wamprecht | 525/66 |
| 4,983,671 | 1/1991 | Numata | 525/63 |

FOREIGN PATENT DOCUMENTS

| | | | |
|---|---|---|---|
| 0029598 | 6/1981 | European Pat. Off. | 525/123 |
| 0096177 | 6/1984 | Japan | 525/123 |
| 0138239 | 8/1984 | Japan | 525/123 |

*Primary Examiner*—James J. Seidleck
*Assistant Examiner*—I. Zemel
*Attorney, Agent, or Firm*—Chris P. Konkol

[57] ABSTRACT

A coating composition comprising a hydroxy functional graft copolymer characterized by macromoners attached at a terminal point to a polymeric backbone. The composition further comprises a polyisocyanate curing agent. Such compositions provide an improved balance of pot life and cure properties.

10 Claims, No Drawings

COATING COMPOSITIONS BASED ON GRAFT POLYMERS

This is a continuation division of application Ser. No. 07/738,678, filed Jul. 31, 1991, now abandoned.

TECHNICAL FIELD

This invention relates to an improved composition for coating a variety of substrates. In particular, this invention is directed to a coating composition comprising a graft copolymer having hydroxy functionality for reaction with an isocyanate crosslinking agent.

BACKGROUND OF THE INVENTION

Automobiles and trucks receive exterior finishes for several well known reasons. First, such finishes provide barrier protection against corrosion. Second, consumers prefer an exterior finish having an attractive aesthetic finish, including high gloss and excellent DOI (distinctness of image).

A typical automobile steel panel or substrate has several layers of finishes or coatings. The substrate is typically first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or colorcoat is next applied over the primer. A typical basecoat or colorcoat comprises a pigment, which may include metallic flakes in the case of a metallic finish. In order to protect and preserve the aesthetic qualities of the finish on the vehicle, it is well known to provide a clear (unpigmented) topcoat over the colored (pigmented) basecoat, so that the basecoat remains unaffected even on prolonged exposure to the environment or weathering.

Coating compositions comprise one or more film-forming polymers. Most commonly, linear polymers are employed that cure, upon application, by reaction with crosslinking agents. However, the use of non-linear graft copolymers has been disclosed. For example, U.S. Pat. No. 4,801,653 to Das et al. describes the use of hydroxy functional graft copolymers. Das et al. disclose grafting by a condensation reaction between epoxy groups of a glycidyl ester, contained in an acrylic polymer, and carboxy groups on at least a portion of vinyl monomers which are polymerized in the presence of the acrylic polymer. Such graft copolymers were found to exhibit excellent sag resistance without the necessity for externally added rheology control.

In preparing graft polymers in general, various living polymerization methods have been disclosed for obtaining functional ended polymers by selective termination of living ends. Such functional ended polymers may subsequently be attached to another polymer, that is, as so-called macromonomer "arms" on a polymeric backbone to form a comb graft copolymer. Webster, in "Living Polymerization Methods," 251 SCIENCE 887 (22 Feb. 1991) generally discloses living polymerization methods for preparing architectural forms of polymers, including graft and comb copolymers.

U.S. Pat. No. 4,680,352 to Janowicz et al. and U.S. Pat. No. 4,722,984 to Janowicz disclose the use of cobalt (Co) chelates as chain transfer agents in free radical polymerization. The latter patent discloses that macromonomers prepared by cobalt chain transfer can be polymerized to produce graft copolymers which are useful in coating and molding resins, including high solid finishes and aqueous or solvent based finishes, although the use of such polymers have so far found only limited use in the finishes area. The use of chain transfer agents to prepare dispersed polymers used in automotive coatings is disclosed in U.S. Pat. No. 5,010,140. Such dispersions are disclosed to be useful for modifying the rheology and/or the physical properties of coatings.

The present invention relates to coating compositions involving isocyanate chemistry. The evolution towards low volatile organic content (VOC) coatings has led to the need to develop new products with desirable properties. For example, with regard to isocyanate systems, it is now even more desirable to solve the problem of poor pot life and initial hardness and to achieve an optimum balance of these properties.

SUMMARY OF THE INVENTION

It has been found that improved polyurethane coating systems are obtained by using certain structured graft copolymers, especially polymers prepared with a cobalt chain transfer agent. In one particular application, a two package (2K) clearcoat according to the present invention was found to exhibit significantly longer pot life and improved initial hardness relative to linear polymer systems.

The strutured polymers employed in the present invention have the further advantage of providing cost savings, since lower levels of relatively expensive materials, namely functional monomers and crosslinkers, may be necessary. The present invention is directed to a coating composition comprising:

(a) from about 5 to 90 percent, based on the weight of the binder, of a graft copolymer having a weight average molecular weight of 1500 to 50,000 comprising:
  (i) a polymeric backbone comprising from about 0 to 75 percent, based on the weight of the backbone, of polymerized ethylenically unsaturated monomers containing a hydroxy functionality; and
  (ii) 1 to 80 percent, by weight of the graft polymer, of macromonomers attached to said polymeric backbone at a single terminal point of each macromonomer, said macromonomer comprising from about 0 to 75 percent, based on the weight of the macromonomer, of polymerized ethylenically unsaturated monomers containing hydroxy functionality, such that at least 5 percent of either said backbone or said macromonomer comprises polymerized ethylenically unsaturated monomers containing a hydroxy functionality;

(b) 10 to 60 percent of a polyisocyanate crosslinking agent which, when the composition is cured, can react and crosslink with said hydroxy functionality in said graft polymer; and (c) from 10 to 70% by weight, based on the weight of the composition, of a liquid organic carrier.

The above-defined graft copolymer may be present in the binder in a substantial amount or as the primary (majority) component or even as the only film forming polymer with the exception of crosslinking agents and rheology controllers. This graft copolymer may also be employed together with a curable linear film forming polymer, in various proportions.

The present composition is especially useful for finishing the exterior of automobiles and trucks and parts thereof. The present composition, depending on the presence of pigments and other conventional components, may be used as a primer, primer surfacer, basecoat, and/or clearcoat. The invention also includes a process for coating a substrate with the above coating composition. The claimed composition further includes a substrate having adhered thereto a coating according to the above composition.

DETAILED DESCRIPTION OF THE INVENTION

The present coating composition involves the use of a certain kind of hydroxy functional graft copolymer as a reactive component with a polyisocyanate crosslinking agent. Such a graft copolymer has been found to provide improved properties, in particular a significantly improved balance of pot life and initial hardness.

In general, the total polymeric and oligomeric components of a coating composition are conventionally referred to as the "binder" or "binder solids" and are dissolved, emulsified or otherwise dispersed in an organic solvent or liquid carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The coating composition of the present invention suitably contains about 30-90%, more typically 40-80% by weight of the binder, and about 10-70%, more typically 20-60% by weight, of an organic solvent carrier.

The present composition suitably comprises about 5 to 90 percent, preferably 20 to 90%, based on the weight of the binder, of the specified graft polymer. In one particular embodiment, the graft copolymer is the primary film forming component in the composition.

This graft copolymer has a weight average molecular weight of 1500 to 50,000, preferably 2500 to 20,000. All molecular weights disclosed herein are determined by gel permeation chromatography using a polystyrene standard. Linear film-forming polymers, preferably 0 to 55 percent by weight (and concomitantly 45 to 100% by weight of the graft copolymer), based on the weight of the binder, may also be used in conjunction with the graft copolymer.

The graft polymer may be prepared by polymerizing ethylenically unsaturated monomers in the presence of macromonomers each having a terminal ethylene unsaturation for grafting. The resulting graft polymer can be envisioned as being composed of a backbone having a plurality of macromonomer "arms" attached thereto. In the present composition, both the macromonomer arms and the backbone may have reactive functionalities capable of reacting with a crosslinking compound or polymer, although it is optional to have such reactive functionalities only on the backbone or the macromonomers. It is to be understood that the macromonomers referred to as having hydroxy functionality may be part of a mixture of macromonomers of which a portion do not have any hydroxy functionality or variable amounts of hydroxy functionality. It is also understood that, in preparing any macromonomers, there is a normal distribution of functionality.

In the preferred process of preparing the present graft copolymers, cobalt chain transfer is employed in the first step of a two step process. This first step typically involves polymerizing, in an inert organic solvent, a mixture of ethylenically unsaturated monomers using a catalytic chain transfer agent, preferably containing $Co^{+2}$, to obtain macromonomers. The mixture of monomers may comprise from zero to about 75 percent, based on the weight of the macromonomers, of ethylenically unsaturated monomers containing a hydroxy functionality (and concomitantly 25 to 100 percent, by weight of said macromonomers, of ethylenically unsaturated monomers not containing a hydroxy functionality). The precise amount of hydroxy functionality in the macromonomer may depend on the particular application.

As indicated above, the preferred catalytic chain transfer agent is a compound which contains $Co^{+2}$. Exemplary cobalt chelates are those described in U.S. Pat. No. 4,680,352 to Janowicz et al. and U.S. Pat. No. 4,722,984 to Janowicz, hereby incorporated by reference in their entirety. Most preferred chelates are pentacyanocobaltate (II), diaquabis(borondifluorodimethyl-glyoximato) cobaltate (II) and diaquabis(borondifluorodiphenylglyoximato) cobaltate (II). Such chain transfer agents are ordinarily used at concentrations of 5-150 ppm based on the monomers.

Typically, a mixture of monomers and organic liquid is heated, preferably to reflux temperature for ease of control, and to the mixture is added the catalytic chain transfer agent of choice, additional monomers and solvent, and the usual amount of a conventional polymerization initiator such as an azo- or peroxide initiator. The reaction is run, with additions of monomers and initiator as needed, until the desired macromoners are obtained having the desired molecular weight. Suitable solvents are aromatic and aliphatic hydrocarbons or mixtures thereof.

The monomers which are polymerized are ethylenically unsaturated monomers. Monomers not containing hydroxy functionality include alkyl acrylates, alkyl methacrylates, cycloaliphatic acrylates, cycloaliphatic methacrylates, aryl acrylates, aryl methacrylates, and mixtures thereof, wherein the alkyl, aliphatic, cycloaliphatic, and aryl groups having 1 to 12 carbon atoms. Suitable alkyl methacrylate monomers used to form the graft copolymer, both the macromonomers and, as described below, the backbone to which the macromonomers are attached, are methyl methacrylate, ethyl methacrylate, propyl methacrylate, butyl methacrylate, isobuytyl methacrylate, isobutyl methacrylate, pentyl methacrylate, hexyl methacrylate, octyl methacrylate, nonyl methacrylate, lauryl methacrylate, and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

Ethylenically unsaturated monomers containing hydroxy functionality include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Hydroxy functionality may also be obtained from monomer precursors, for example, the epoxy group of a glycidyl methacrylate unit in a polymer. Such an epoxy group may be converted, in a post polymerization reaction with water or a small amount of acid, to a hydroxy group. Acid monomers may also be converted to hydroxy functional units by reaction with epoxies. It is to be understood that, by the term "polymerized ethylenically unsaturated monomers containing hydroxy functionality" is meant polymeric units that are hydroxy functional in the composition when it is applied.

In addition to the above-mentioned monomers, lesser amounts of other polymerizable monomers, up to about 50% by weight of the polymer, can be used in the polymer for the purpose of achieving the desired properties such as hardness, appearance, mar resistance, and the like. Non-functional monomers such as styrene or methyl styrene may be used. Exemplary of functional monomers are acids such as acrylic or methacrylic acid, maleic acid, and itaconic acid; epoxies such as glycidyl methacrylate; esters such as vinyl acetate; amines such as dialkyl amine acrylate or tertiary aminobutyl acrylate; acrylamide, acrylonitrile, methacrylonitrile, or silane-containing monomers such as gamma-methacyloxypropyl trimethoxy silane; halo containing monomers such as fluoroalkyl acrylates and methacrylates, and such other monomers as are desired for obtaining properties of a composition for a particular application or formulation.

The second step in the preferred process of preparing the graft copolymer involves forming a polymeric backbone by polymerizing, in an organic solvent, in the presence of said previously prepared macromonomers, another mixture of ethylenically unsaturated monomers comprising 5 to 75 percent, preferably 15 to 40 percent, based on the weight of the backbone, of polymerized ethylenically unsaturated monomers containing a reactive hydroxy functionality (and concomitantly 25 to 95 percent, preferably 60 to 85 percent, based on the weight of the backbone, of polymerized ethylenically unsaturated monomers not containing a hydroxy functionality). This polymerization, whereby the backbone of the graft polymer is formed, may employ any free radical or vinyl addition polymerization reaction process, and does not necessarily require a chain transfer agent. A typical vinyl addition polymerization reaction is usually conducted at a temperature within the range of about 125° C. to about 200° C., preferably 140° C. to 160° C.

The monomers making up the backbone may be any combination of monomers selected from, but not necessarily limited to, the monomers previously mentioned above with respect to the macromonomers. It is to be understood that the monomer make-up of the macromonomers and the backbone need not be the same, and in fact diverse properties such as Tg's may be desirable. It may be desirable to have higher amounts of styrene in the backbone.

During polymerization of the backbone, there is generally present a free radical initiator which is selected from a wide variety of materials. Suitable types of materials include peroxides, hydroperoxides and azo initiators. Examples of these types of initiators include di-tertiarybutyl peroxide, di-cumylperoxide; amyl peroxyacetate; cumenehydroperoxide; 2,5-dimethyl-2,5-bis(tertiarybutylperoxy) hexane; hexyne-3-tertiarybutyl cumylperoxide; tertiaryamyl peroxide; 2,5-dihydroperoxy-2,5-dimethyl hexane, di(n-propyl) peroxydicarbonate, and 2,2'-azobis (2,4-dimethyl-4-methoxyvaleronitrile).

The amount of initiator can vary widely, although usually it is present in an amount ranging from about 3 percent to about 8 percent, the percentage based on the total weight of the vinyl monomer component. Generally, there is also present during the vinyl addition polymerization a solvent which assists in maintaining the preferred reaction temperature. Typical solvents and diluents include toluene, xylene. butyl acetate, acetone, methyl isobutyl ketone, methyl ethyl ketone, ethyl amyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, aromatic petroleum distillates, esters, ethers and ketones, and the like.

During the above described second polymerization reaction, each of the macromonomers are incorporated into a backbone, as it is formed, of the graft copolymer at a single terminal point of each macromonomer. Preferably, attachment of macromonomers to the backbone of the graft polymer occurs by the reaction of a terminal ethylene unsaturation on said macromoner with the monomers which polymerize to form the backbone.

The graft polymer so-produced comprises a polymeric backbone comprising 5 to 75 percent, preferably 15 to 40 percent, based on the weight of the backbone, of polymerized ethylenically unsaturated monomers containing a hydroxy functionality and 25 to 95 percent, preferably 60 to 85 percent, based on the weight of the backbone, of polymerized ethylenically unsaturated monomers not containing hydroxy functionality. The macromonomers, covalently bonded to said polymeric backbone at a single terminal point of said macromonomer, comprise optionally zero, or alternatively between zero (0) and 75 percent, preferably between 0 and 25 percent, based on the weight of said macromonomer, of polymerized ethylenically unsaturated monomers containing hydroxy functionality (and concomitantly, when not 100 percent, between 25 and 100 percent, preferably between 75 to 100 percent, based on the weight of said macromonomer, of polymerized ethylenically unsaturated monomers not containing hydroxy functionality). The macromonomer portion of the graft polymer suitably comprises 1 to 80 percent, preferably 15 to 60 percent by weight of the graft copolymer. Such percents are, of course, an overall average equal to the percent of units in the reaction mixture forming the reaction product, since there is a distribution in any reaction.

The graft copolymers of the present invention are useful as film forming vehicles in the preparation of high solids coating compositions such as, for example, clear coating compositions useful in automotive applications. The resultant coating compositions have low volatile organic content, preferably to a maximum of 3.50 pounds/gallon.

In preparing the coating compositions of the present invention, the graft copolymer is combined with a polyisocyanate or blocked polyisocyanate crosslinking (curing) agent, which is capable of reacting with the hydroxyl functionality which is present on the graft copolymer.

Typically, a cure promoting catalyst is utilized in conjunction with the crosslinking or curing agent. Preferred catalysts are organometallics, suitably dibutyl tin dilaurate, dibutyl tin di-2-ethylhexoate, zinc octoate, zinc napthenate, vanadium acetyl acetonate, or zirconium acetyl acetonate, in an effective curing amount, typically from about 0.1 to 2% by weight of binder. Such catalysts are optional, for example, elevated temperature and/or time may suffice to cure the composition.

Typical isocyanate crosslinking agents which may be used for curing the composition include both compounds and polymers, blocked or unblocked. Examples of suitable polyisocyanates include monomeric polyisocyanates such as toluene diisocyanate and 4,4'-methylene-bis(cyclohexylisocyanate), isophorone diisocyanate and NCO-prepolymers such as the reaction products of monomeric polyisocyanate such as those mentioned above with polyester or polyether polyols. Particularly useful isocyanates are isophorone diisocyanate and the biuret-form 1,6-hexamethylene diisocyanate commercially available from Bayer as "Desmodur" N or the like. Other crosslinking agents include 4,4'-biphenylene diisocyanate, tetramethyl diisocyanate, ethylethylene diisocyanate, 1,3-cyclopentylene diisocyanate, 1,3-phenylene diisocyanate, 1,5-naphthalene diisocyanate, bis(4-isocyanatocyclohexyl)methane, and the like.

Trifunctional isocyanates may be used, for example, triphenylmethane triisocyanate, 1,3,5-benzene triisocyanate, 2,4,6-toluene triisocyanate, an adduct of trimethylol and tetramethyl xylene diisocyanate sold under the tradename "Cythane 3160," "Desmodur" N 3390 which is the trimer of hexamethylene diisocyanate, and the like. Optionally, one can use a polyisocyanate acrylic copolymer derived from isocyanatoethyl methacrylate (commercially available as TMI) and the like, as for example disclosed in U.S. Pat. No. 4,965,317 (col. 5) hereby incorporated by reference.

As indicated above, the polyisocyanate may optionally b blocked. Examples of suitable blocking agents are those materials which would unblock at elevated temperatures, for example, lower aliphatic alcohols such as methanol, oximes such as methylethyl ketone oxime, and lactams such as epsiloncaprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

A solvent is also typically utilized in the present composition, preferably in minimal amounts, to facilitate formulation and application of the coating compositions of the present invention. An organic solvent is utilized which is compatible with the components of the composition. The amounts of graft copolymer, curing agent, and catalyst will, of course, vary widely depending upon many factors, among them the specific components of the composition and the intended use of the composition.

In addition, a composition according to the present invention may contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1-5% by weight, based on the weight of the binder. Such stabilizers include ultraviolet light absorbers, screeners, quenchers, and specific hindered amine light stabilizers. Also, an anitoxidant can be added, in the about 0.1-5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition may also include conventional formulation additives such as flow control agents, for example, Resiflow ® S (polybutylacrylate), BYK 320 and 325 (high molecular weight polyacrylates); rheology control agents, such as fumed silica, microgels, and non-aqueous dispersion polymers; water scavengers such as tetrasilicate, trimethyl orthoformate, triethyl orthoformate, and the like.

When the present composition is used as a clearcoat (topcoat) over a pigmented colorcoat (basecoat) to provide a colorcoat/clearcoat finish, small amounts of pigment can be added to the clear coat to provide special color or aesthetic effects such as tinting.

The present composition can be pigmented and used as the colorcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The present composition can be used to coat plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating compositon by first forming a mill base or pigment dipersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition. to obtain the present coating compositions. The coating composition can be applied by conventional techniques such as spraying, electrostatic spraying, dipping, brushing, flowcoating and the like. The preferred techniques are spraying and electrostatic spraying. The present composition may be used as an ambient cure, especially for refinish, or at elevated temperature. In OEM applications, the composition is typically baked at 100°-150° C. for about 15-30 minutes to form a coating about 0.1-3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated.

EXAMPLE 1

This example illustrates the preparation of a macromonomer used in forming a graft copolymer employed in the present composition. To a five liter flask equipped with a condenser, agitator, thermometer and heating mantle were charged 827.9 g of toluene, 15.4 g of isobutyl methacrylate, 199.5 g of 2-hydroxyethyl methacrylate, and 460.9 g of 2-ethylhexyl methacrylate. The mixture was heated to reflux under a nitrogen blanket. Upon reaching a steady reflux, a mixture of 51.2 g of methyl ethyl toluene and 1.0 g of 1,1'-azobis(-cyanocyclohexane) (Vazo 88, a trademark of Du Pont) was added over 10 minutes to the reaction mixture. A mixture of 374.6 g of isobutyl methacrylate, 439.2 g of 2-ethylhexyl methacrylate, 226.9 g of 2-hydroxyethyl methacrylate, 200.03 g of toluene, 3.93 g of Vazo 88, and 35.0 g of xylene was then added evenly over a period of 4 hours. At the end of the addition, a mixture of 89.1 g of toluene and 0.95 g of 1,1'-azobis(cyanocyclohexane) were added over 1 hour to the reaction mixture. The reaction was held at reflux for an additional hour. It was then cooled. A polymer with an Mn of 10,400 and Mw of 21,200 was obtained as determined from GPC.

EXAMPLE 2

This example illustrates the preparation of a graft copolymer employed in the present composition. To a five liter flask equipped with a condenser, agitator, thermometer and heating mantle were charged 541.73 g of xylene and 1238.37 g of the macromonomer solution of Example 1. The mixture was heated to reflux under a nitrogen blanket. Upon reaching a steady reflux, a mixture of 196.66 g of styrene, 589.89 g of isobutyl methacrylate, 262.19 g of 2-hydroxyethyl methacrylate, 262.19 g of methyl methacrylate, 62.96 g of t-butyl peroxyacetate (75% solution in mineral spirits) and 60.65 g of xylene were added evenly over a 3 hour period to the reaction mixture. After the addition was completed, 16.10 g of t-butyl peroxyacetate solution and 269.25 g of xylene were added at once. The reaction was held at reflux temperature for an additional 1 hour. A polymer with a $M_n$ of 8600 $M_w$ of 19,400 was obtained.

COMPARATIVE EXAMPLE 3

This example illustrates a comparative composition employing a linear polymer instead of the graft copolymer of Example 1. The linear polymer is first obtained as follows. To a five liter flask equipped with a condenser, agitator, thermometer and heating mantle were charged 1054.0 g of xylene. The solvent was heated to reflux under a nitrogen blanket. Upon reaching a steady reflux, a mixture of 305.1 g of styrene, 915.3 g of isobutyl methacrylate, 406.8 g of 2-hydroxyethyl methacrylate, 406.8g of methyl methacrylate, 97.73 g of t-butyl peroxyacetate (75% solution in mineral spirits) and 98.65 g of xylene were added evenly over a 3 hour period to the reaction mixture. After the addition was completed, 12.18 g of t-butyl peroxyacetate solution and 203.42 g of xylene were added at once. The reaction was held at reflux temperature for an additional 1 hour. A polymer with a $M_n$ of 7800 and $M_w$ of 13,200 was obtained.

A coating composition containing this linear polymer was then made as follows. A combination of 66.7 parts of this polymer and 12.5 parts of Desmodur N 3390 (Bayer Canada, Inc.) were mixed with 0.5 parts of a 1% dibutyl tin dilaurate solution in xylene. Xylene was added to dilute the final resin to 50% solids. The resulting composition was applied on glass plates to a dry film thickness of 2.9 mm using a bar coater and dried at ambient conditions for 24 hours to give a cured film having a hardness of 0.87 knoop. The gel time for the composition was 3.7 hours.

EXAMPLE 4

An isocyanate-cured coating according to the present composition was made as follows. A combination of 61 parts of the resin of Example 1 and 12.5 parts of a polyisocyanate curing agent Desmodur N 3390 (Bayer Canada, Inc.) were mixed with 0.5 parts of a 1% dibutyl tin dilaurate solution in xylene. Xylene was added to dilute the final resin to 50% solids. The resulting composition was applied on glass plates to a dry film thickness of 2.9 mm using a bar coater and dried at ambient conditions for 24 hours to give a cured film having a hardness of 1.79 knoop. The gel time for the composition was 7.0 hours.

Those skilled in the art will no doubt be able to compose numerous variations on the themes disclosed, such as changing the amounts of ingredients insignificantly from those shown, adding innocuous or supplementary substances, or substituting equivalent components for those shown. Such variations are considered to be within the inventive concept, as defined in the following claims.

What is claimed is:

1. A coating composition comprising 30-90% by weight of binder and 10-70% by weight of a liquid organic carrier, useful for coating a substrate, wherein the binder comprises:
    (a) 5 to 90% based on the weight of the binder, of a graft copolymer having a molecular weight of 1500 to 50,000 consisting essentially of:
        (i) a polymeric backbone comprising from about 5 to 7%, based on the weight of the backbone, of polymerized ethylenically unsaturated monomers containing a hydroxy functionally; and
        (ii) 1 to 80%, by weight of the graft polymer, of macromonomers attached to said polymeric backbone at a single terminal point of said macromonomer; and
    (b) 10 to 60%, by weight of the binder, of a polyisocyanate crosslinking agent.

2. A coating composition, useful for coating a substrate comprising 30-90% by weight of binder and 10-70% by weight of a liquid organic carrier, wherein the binder comprises:
    (a) 5 to 90%, based on the weight of the binder of a graft copolymer having a molecular weight of 1500 to 50,000 consisting essentially of:
        (i) a polymeric backbone; and (ii) 1 to 80%, by weight of the graft polymer, of macromonomers attached to said polymeric backbone at a single terminal point of said macromonomer comprising from about 5 to 75%, based on the weight of the macromonomers, of polymerized ethylenically unsaturated monomers containing a hydroxy functionally; and (b) 10 to 60%, by weight of the binder, of a polyisocyanate crosslinking agent.

3. The composition of claim 1 or 2, further comprising an effective amount of a curing catalyst.

4. The composition of claim 1 or 2, wherein said graft polymer is the product of the reaction of a terminal ethylene unsaturation on said macromonomer with monomers which polymerize to form said polymeric backbone.

5. The composition of claim 1, wherein said macromonomers comprise between 0 and 75% by weight, based on the weight of said macromononmer, of polymerized ethylenically unsaturated monomers containing hydroxy functionality.

6. The composition of claim 2, wherein said backbone comprise between 0 and 75% by weight, based on the weight of said macromononmer, of polymerized ethylenically unsaturated monomers containing hydroxy functionality.

7. The composition of claim 1 or 2, said backbone or macromomoners further comprise polymerized ethylenically unsaturated monomers not containing hydroxy functionality, which monomers are selected from the group consisting of alkyl acrylates, alkyl methacrylates, cycloaliphatic acrylates, cycloaliphatic methacrylates, aryl acrylates, aryl methacrylates, styrene, alkyl styrene, and mixtures thereof; and wherein the ethylenically unsaturated monomers containing hydroxy functionality comprise monomers selected from the group consisting of hydroxy alkyl acrylates and hydroxy alkyl methacrylates, wherein the above-mentioned alkyl, cycloaliphatic, and aryl groups have 1 to 12 carbon atoms.

8. The composition of claim 1 or 2, wherein said graft polymer in addition comprises one or more functionalities selected fron the group consisting of amine, silane, acid, or combinations thereof.

9. A method of coating a substrate comprising applying a layer of the composition of claim 1 to the substrate to form a coating and curing the coating.

10. A substrate coated with a composition of claim 1.

* * * * *

UNITED STATES PATENT AND TRADEMARK OFFICE
CERTIFICATE OF CORRECTION

PATENT NO. : 5,290,633
DATED : March 1, 1994
INVENTOR(S) : Brian P. Devlin, Joseph Albert Antonelli, Christopher Scopazzi It is certified that error appears in the above-identified patent and that said Letters Patent is hereby corrected as shown below:

<u>In the Claims</u>:

Column 10, line 52, delete "7%" and insert therefor --75%--

Signed and Sealed this

Fifth Day of July, 1994

BRUCE LEHMAN

*Attest:*

*Attesting Officer*  *Commissioner of Patents and Trademarks*